United States Patent
Kelly et al.

(10) Patent No.: US 7,610,617 B2
(45) Date of Patent: Oct. 27, 2009

(54) AUTHENTICATION SYSTEM FOR NETWORKED COMPUTER APPLICATIONS

(75) Inventors: Edward R. Kelly, Rock Hill, SC (US); Christopher Wayne Howser, Concord, NC (US); Jonathan Francis Savage, Charlotte, NC (US); Yuliang Zheng, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 11/022,534

(22) Filed: Dec. 22, 2004

(65) Prior Publication Data

US 2005/0138362 A1 Jun. 23, 2005

Related U.S. Application Data

(60) Provisional application No. 60/531,695, filed on Dec. 23, 2003.

(51) Int. Cl.
*G06F 7/04* (2006.01)
*G06F 21/00* (2006.01)
*H04L 9/32* (2006.01)

(52) U.S. Cl. ............ 726/5; 726/6; 726/7; 726/8; 726/9; 726/10; 713/156; 713/172; 713/185

(58) Field of Classification Search ............... None
See application file for complete search history.

(56) References Cited

U.S. PATENT DOCUMENTS

| | | | |
|---|---|---|---|
| 6,212,635 B1 * | 4/2001 | Reardon ............... 713/165 |
| 6,510,464 B1 * | 1/2003 | Grantges et al. ......... 709/225 |
| 6,609,198 B1 * | 8/2003 | Wood et al. ............ 713/155 |
| 6,711,679 B1 | 3/2004 | Guski et al. ............ 713/156 |
| 6,763,468 B2 * | 7/2004 | Gupta et al. ............ 726/2 |
| 7,114,078 B2 * | 9/2006 | Carman ............... 713/185 |
| 7,234,157 B2 * | 6/2007 | Childs et al. ............ 726/2 |
| 7,373,508 B1 * | 5/2008 | Meier et al. ............ 713/168 |
| 7,376,625 B2 | 5/2008 | Koskela et al. .......... 705/57 |
| 2002/0032857 A1 | 3/2002 | Kon et al. ............. 713/156 |
| 2002/0164047 A1 * | 11/2002 | Yuval ............... 382/100 |
| 2003/0005118 A1 * | 1/2003 | Williams ............. 709/225 |
| 2003/0074562 A1 * | 4/2003 | Hansen et al. .......... 713/176 |
| 2004/0168083 A1 * | 8/2004 | Gasparini et al. ........ 713/201 |

OTHER PUBLICATIONS

Bruce Schneier, Applied Cryptograph, 1996, John Wiley & Sons, Second Edition, p. 216.*
Alfred J. Menezes, Handbook of Applied Cryptography, 1997, CRC Press, p. 559.*
Stuart Haber, "How to Time-Stamp a Digital Document," 1991, Advances in Ctyptology—CRYPTO '90 Proceedings, Springer-Verlag, pp. 437-455.

* cited by examiner

Primary Examiner—Benjamin E Lanier
(74) Attorney, Agent, or Firm—K&L Gates LLP

(57) ABSTRACT

A system such as in a networked computer system comprising a user, an application server, a gatekeeper server and an authentication server. Communication within the system is managed by the gatekeeper server, wherein the user communicates with the authentication server and the application server through the gatekeeper server. Once the user has been initially authenticated by the authentication server, the user may request application services from a plurality of application servers within the networked computer system without having to be re-authenticated.

34 Claims, 12 Drawing Sheets

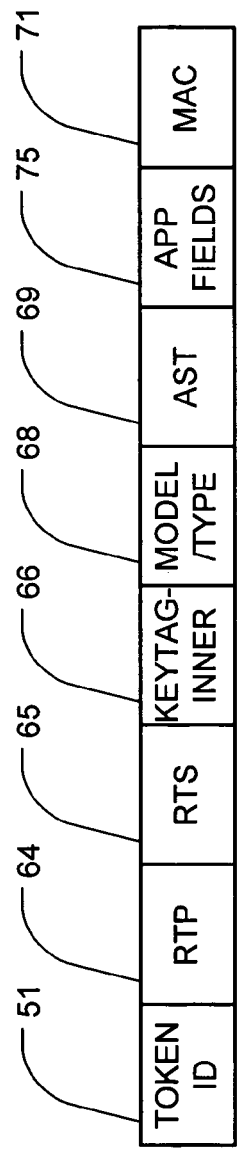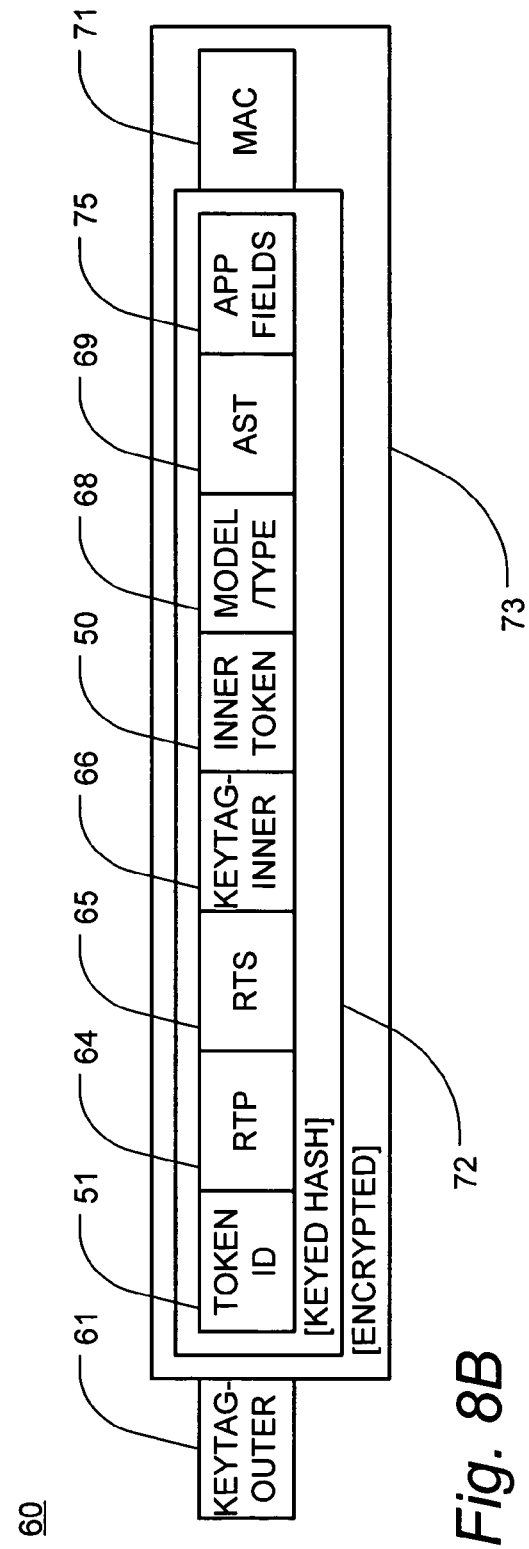
Fig. 8A
Fig. 8B

AUTHENTICATION SYSTEM FOR NETWORKED COMPUTER APPLICATIONS

CROSS-REFERENCE TO RELATED APPLICATIONS

This application is entitled to the benefit of, and claims priority to provisional U.S. patent application Ser. No. 60/531,695, filed on Dec. 23, 2003, which is incorporated herein by reference in its entirety.

FIELD OF THE INVENTION

The present invention relates to a system and a method for protecting applications within a networked computer system.

BACKGROUND OF THE INVENTION

Businesses and individuals are increasingly dependent on computers and computer-based electronic communication. More and more businesses are moving toward "paperless" modes of operation, and the convenience of the Internet has resulted in individuals using electronic media for various activities, such as communicating via email, banking, paying bills, investing money and shopping, to name but a few. While businesses and individuals desire the convenience of electronic transactions, these entities also want to maintain at least the same level of security that more traditional transactional methods provide. However, in some ways, more traditional transactions are inherently more secure than electronic transactions because computers may easily be used to intercept the information being communicated between two or more computers. Accordingly, techniques have been created to secure information being communicated electronically.

Many of these techniques make use of various aspects of cryptography. Cryptography is the study of sending and/or receiving a message in a secret form so that only those authorized to receive the message are able to read it. Cryptography may be used for any form of communication, but for the purposes of this application, cryptography for electronic communication will be discussed. Examples of cryptographic techniques include symmetric encryption, asymmetric encryption and hashing. For electronic communication, an encrypted message may be transformed into a secret form using an encryption key and then may be transformed back into its original or clear form with a decryption key.

In addition to cryptographic functions for securing information, entities desiring to protect information that is stored electronically may also create defined communication relationships between components within a networked computer system and a user wishing to access services within the system. For example, a networked computer system may require that a user be authenticated before being able to receive services from an application within the networked computer system.

In a conventional networked computer system, user authentication may occur at each application server individually, i.e., each application server is responsible for authenticating a user when the user requests services from that application server. This conventional authentication process requires a user to be authenticated for each application server that it wishes to access within the networked computer system.

It is desirable to provide a more efficient, flexible and secure authentication system and method for receiving services from an application server in a networked computer system.

SUMMARY OF THE INVENTION

The present invention relates to a system and method for authenticating a user within a networked computer system. The system comprises a user, an application server, a gatekeeper server and an authentication server, wherein communication within the system is managed by the gatekeeper server.

According to the method of the present invention, the user presents credentials to the gatekeeper server, and the gatekeeper server provides the presented user credentials to the authentication server. The authentication server authenticates the user. The authentication server creates an authentication token upon authentication of the user and transmits the authentication token to the application server. Transmission of the authentication token to the application server from the authentication server may comprise transmitting the authentication token to the gatekeeper server and then the application server. The authentication server may encrypt the authentication token after it has been created. It is preferred that an encryption key used by the authentication server to encrypt the authentication token is shared by the authentication server and application server, but not shared with the gatekeeper server. The authentication server may also digitally sign the authentication token after it has been created. It is preferred that the authentication server sign the authentication token with a key pair, wherein at least a portion of the key pair is shared with the authentication server and application server.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8A is a depiction of the structure and content of the outer token created in FIG. 7.

FIG. 8B is a depiction of a combined token including the contents of the outer token and the inner token of FIGS. 5 and 8A.

DESCRIPTION OF EMBODIMENTS

The following description of the embodiments of the present invention is merely exemplary in nature and is in no way intended to limit the invention, its application, or uses. The present invention has broad potential application and utility, which is contemplated to be adaptable to a wide range of entities for securing and limiting access to applications and information within a networked computer system. For example, it is contemplated that the authentication system and method for networked computer applications would be beneficial for use by any bank that provides online banking, investment and/or mortgage services. Additionally, it is contemplated that the system and method of the present invention would be equally beneficial for user authentication by any retail business that provides online retail services. Further, the system and method of the present invention would be beneficial to any entity maintaining secure applications and information that are accessed by third-party computers or users. The following description is provided herein solely by way of example for purposes of providing an enabling disclosure of the invention, but does not limit the scope or substance of the invention.

A networked computer system comprises an application server, a database system, a gatekeeper server, and a user such as a person, computer, or software application. In a networked computer system that includes application servers capable of accessing sensitive information, protective relationships may be implemented to limit access to the sensitive information.

Figure 1:
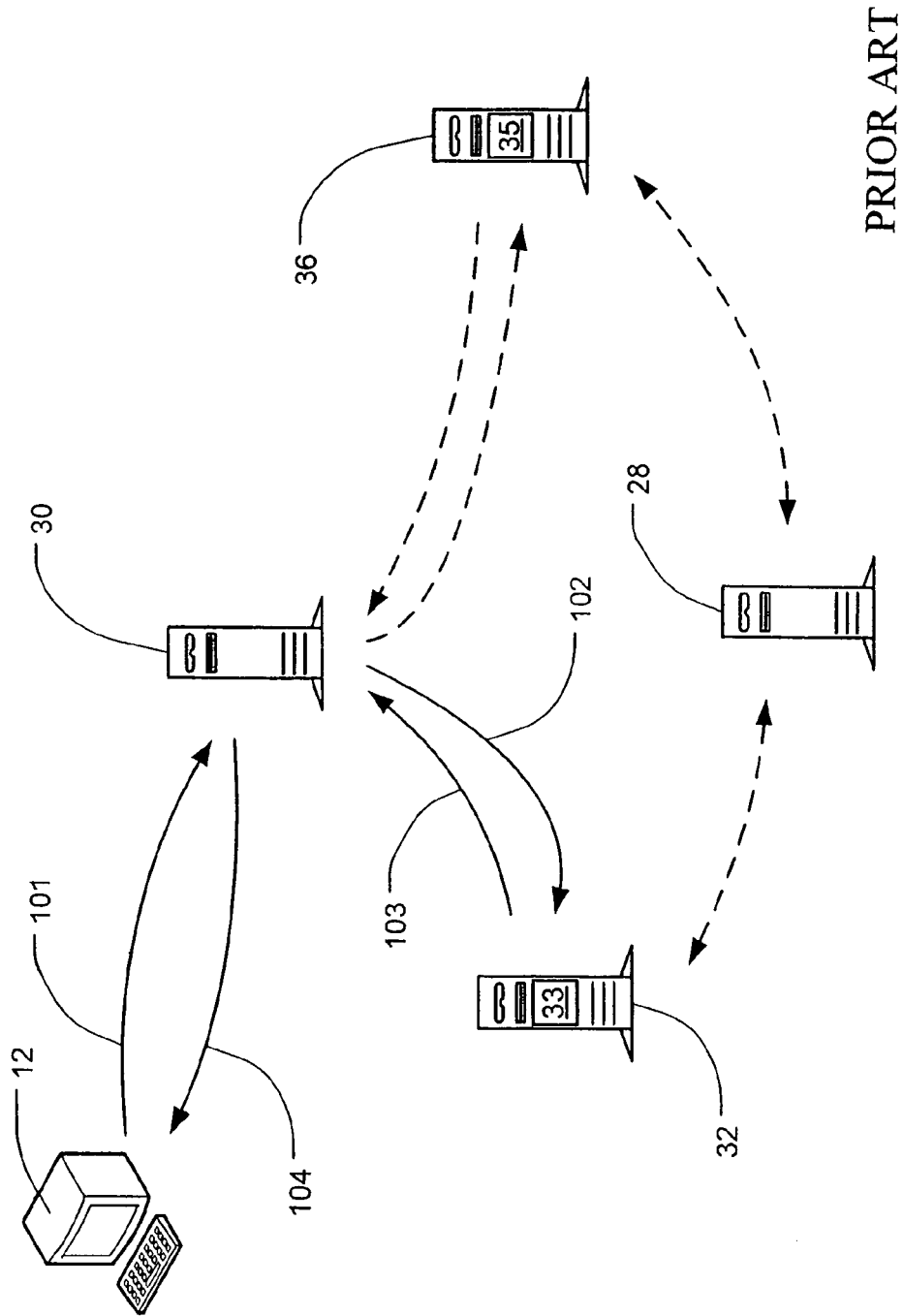
FIG. 1 is a depiction of a conventional authentication system for networked computer applications.

Referring now to the accompanying drawings, FIG. 1 depicts an embodiment of a conventional networked computer system 10. The conventional system 10 may comprise one or more protected application servers 32, 36, a protected database system 28, a gatekeeper server 30 and a user 12. One of ordinary skill will understand that an application server 32, 36 may comprise a plurality of application functions (not shown). Similarly, a database system 28 may comprise a plurality of databases (not shown). The gatekeeper server 30 communicatively connects the application servers 32, 36 and the user 12. In fact, the user 12 may not communicate with the application servers 32, 36 except through the gatekeeper server 30.

In order to receive services from an application server 32 within the system 10, a user 12 may contact the gatekeeper server 30 and request services from the application server 32 by offering user credentials to the gatekeeper server 30 (step 101). The gatekeeper server 30 forwards the user credentials to the application server 32 (step 102), which comprises an authentication application 33. The authentication application 33 compares the given user credentials with the user credentials stored in the database system 28 or the mainframe of the operating entity (not shown). If the user 12 is authenticated, the application server 32 creates an authentication token, which comprises the user credentials. If the user 12 is not authenticated, communication ends.

The application server 32 encrypts the authentication token with an encryption key shared among all servers in the networked computer system. The application server 32 then sends the encrypted authentication token and application response to the gatekeeper server 30 (step 103). The gatekeeper server 30 creates another token, namely an outer token, to be wrapped around the authentication token. The outer token comprises a time stamp that is used to ensure that the outer token has not become stale. The outer token and authentication token together comprise a combined token, which is encrypted by the gatekeeper server 30 with the same encryption key used by the application server 32. The gatekeeper server 30 forwards the encrypted combined token and a response by the application server to the user 12 (step 104).

If the user 12 wishes to access the application server 32 again, the user 12 presents the encrypted combined token to the gatekeeper server 30 and requests access to the application server 32 again. The gatekeeper server 30 decrypts the outer token to ensure that the communication has not timed out. Assuming the outer token has not timed-out, the gatekeeper server 30 presents the encrypted authentication token and the request by the user 12 to the application server 32 (step 102). The application server 32 decrypts the inner token and, using the authentication application 33, compares the information contained in the inner token against the information stored in the database system. If the user 12 is authenticated again, the application server 32 creates a new authentication token, encrypts the authentication token and sends the authentication token, along with the application server 32 response, to the gatekeeper server 30 (step 103). The gatekeeper server 30 creates a new outer token with a new time stamp, combines the authentication token and outer token, encrypts the combined token with the shared encryption key and sends the encrypted combined token and the application server response to the user 12 (step 104). Subsequent requests by the user 12 for services may follow the procedure set forth above.

If a user 12 wishes to access a second application server 36 within the networked computer system 10, the second application server 36 has to perform the same process that the first application server 32 performed to authenticate the user 12. This duplicative process is indicated by dotted flow lines indicating communication between the gatekeeper server 30 and application server 36 in FIG. 1. In a system. 10, a second application server 36 does not receive the benefit of the user authentication previously performed by another application server 32 within the system 10. Rather, each subsequent application server 36 has to repeat the same process for authenticating a user 12 that the first application server 32 has already performed.

The system 10 is relatively easily compromised because it utilizes a single encryption key that is shared by each of the servers in the system 10. In this system 10, a user 12 may be limited to utilizing a username and password for authentication because of the limited functionality of the authentication application 33, 35 in the application servers 32, 36. Additionally, requiring each subsequent application server within the system 10 to authenticate a user 12 that has already been authenticated by a first application server is unnecessarily time consuming for the system 10 and for the user 12. Furthermore, because the inner token of this system 10 has no time-out function, an inner token could theoretically be valid for an indefinite period of time. The availability of valid inner tokens for an indefinite period of time is a further disadvantage of this system 10.

Figure 2:
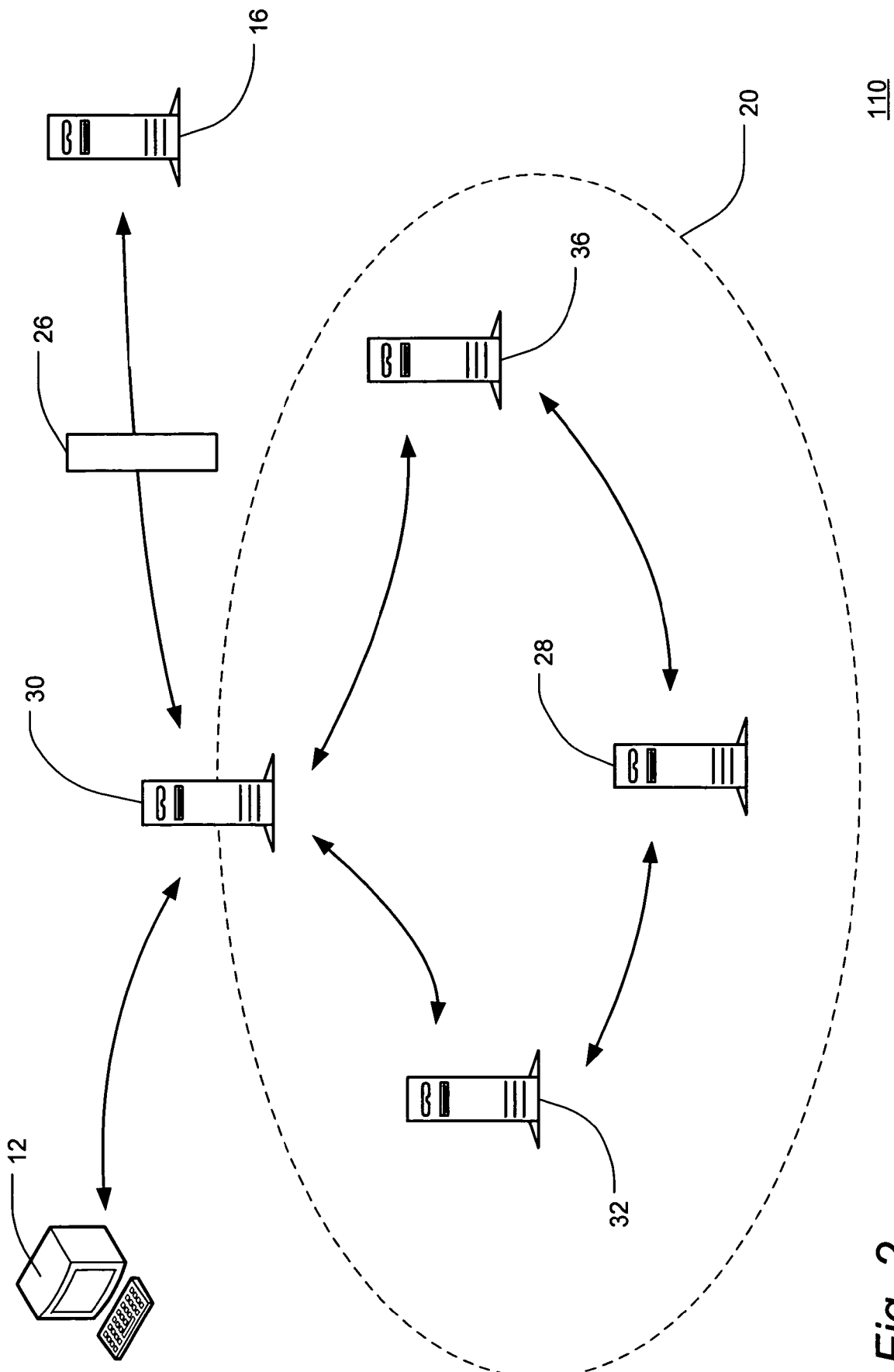
FIG. 2 is a depiction of the networked computer system of the present invention.

FIG. 2 depicts an exemplary networked computer system 110 in accordance with the present invention. The networked computer system 110 of FIG. 2 comprises application servers 32, 36, a database system 28, a gatekeeper server 30, an authentication server 16 and a user 12. In this embodiment, a login server is the authentication server 16 and a web server is the gatekeeper server 30. The web server 30 acts as a communication hub for the networked computer system 110. Specifically, the user 12, the login server 16 and the application servers 32, 36 all communicate with the web server 30 and with one another through the web server 30. In addition to being the communication hub for the networked computer system 110, the web server 30 also provides a protective gatekeeper function, i.e., the web server 30 will not forward a user request to an application server 32, 36 unless the user 12 making the request has been authenticated by the login server 16. In this manner, the application servers 32, 36 are protected from a user 12 that has not been authenticated. As a shorthand way to designate the communication relationship between the user 12, the web server 30, the application servers 32, 36 and the database system 28, with which the application servers 32, 36 communicate, the application servers 32, 36 and database system 28 are said to be in an authentication zone 20. Only a request made by an authenticated user 24 (best shown in FIGS. 9 & 11) will be forwarded by the web server 30 into the authentication zone 20. However, once a user 12 has been authenticated, he or she will be allowed to request application services from any application server 32, 36 within the authentication zone 20 without having to be re-authenticated by the login server 16. One of ordinary skill will appreciate that a plurality of application servers may be located within the authentication zone and further that a plurality of application servers may be needed to provide application services for a single application. For purposes of this application, the reference numeral 12 will be utilized to designate a user that has not been authenticated by the login server, and the reference numeral 24 will be utilized to designate a user that has been authenticated by the login server 16.

The web server 30 also provides a protective function for the login server 16 by prohibiting a user 12 from directly communicating with the login server 16. The login server 16 does not receive direct communication from the user 12, the application servers 32, 36 or the database system 28. Since a user 12 must be authenticated in order for communication from the user 12 to be forwarded into the authentication zone 20, the login server 16 is not located in the authentication zone 20. In order to further secure the login server 16, an additional security measure 26 that prevents unauthorized communication, such as a firewall, may be disposed between the login server 16 and the other components of the system 110.

Figure 3:
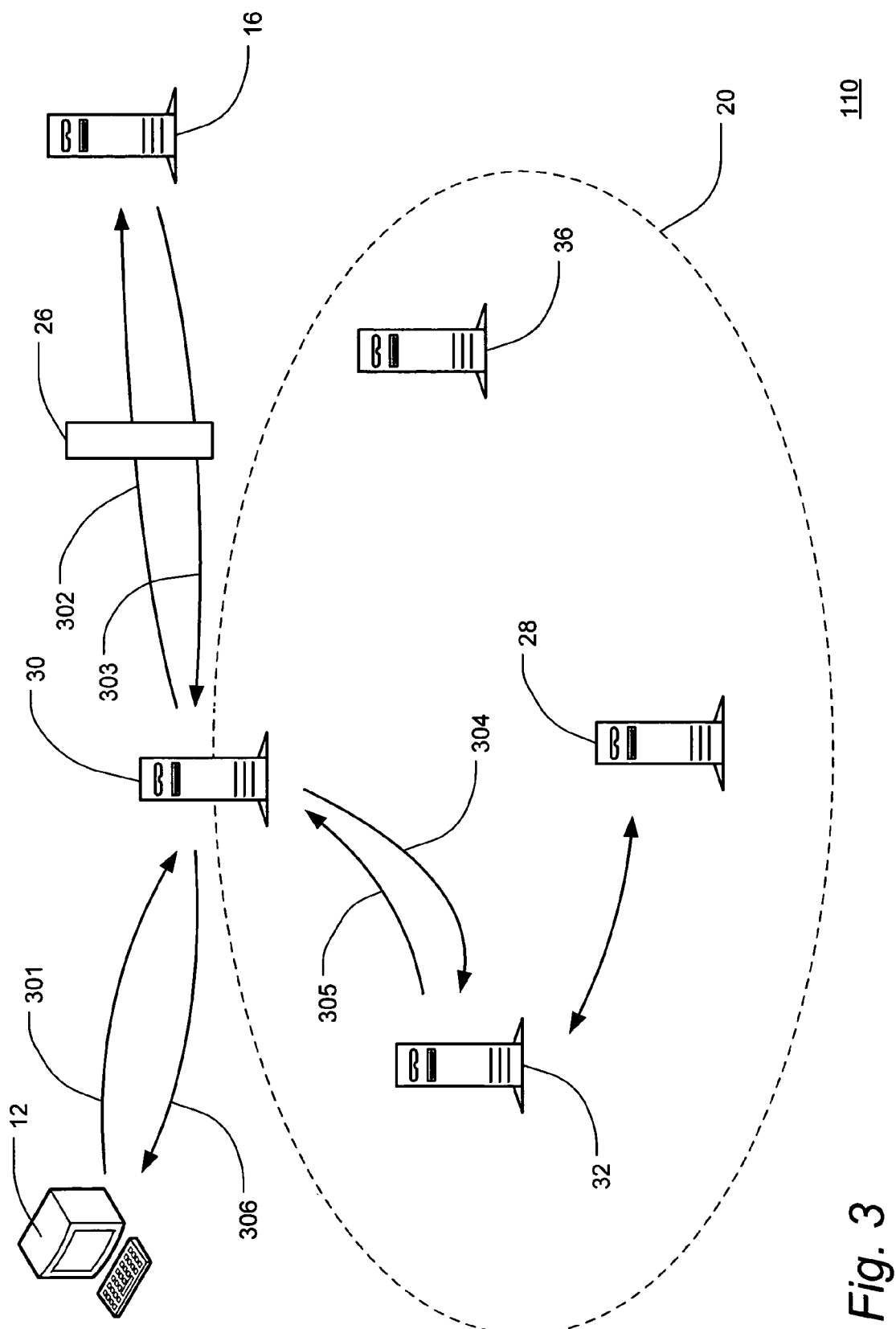
FIG. 3 is a depiction of the authentication process for a user beginning a login session and initially accessing an application server within the authentication zone of the networked computer system of FIG. 2.

FIG. 3 depicts the authentication process for a user 12 beginning a login session and initially accessing an application server 32 within the authentication zone 20 of the networked computer system 110 of FIG. 2. For exemplary purposes, the user 12 in this example may be an individual trying to access his or her account information (application server 32) on a bank web site (web server 30). A user 12 will begin by presenting his or her credentials, which in this example may be a user name and password, to the web server 30 (step 301). User credentials may also include a digital certificate, a portable hardware device such as a secure identification card or any combination of credentials. The security protocol of the entity operating the networked computer system 110 will determine the nature of the credentials which will be accepted. Additionally, the system and method of the present invention assumes a user's initial registration with the entity operating the networked computer system 110, whereby the user 12 provides identification information to the entity and the entity stores this identification information with the user's credentials for later authentication. Registration methods of this type are conventional and thus further explanation is not provided herein. The web server 30 then presents the user's credentials to the login server 16 (step 302).

Figure 4:
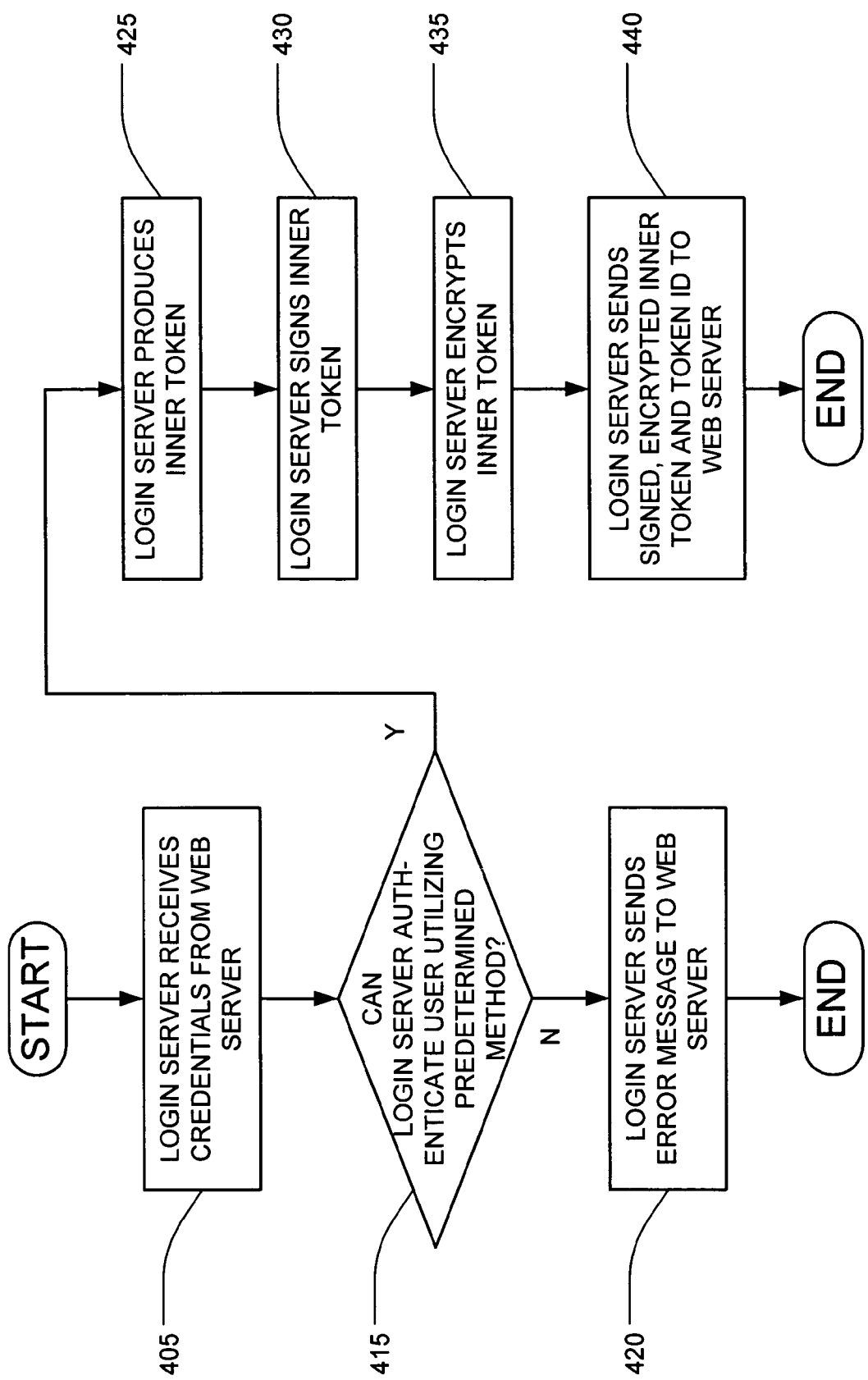
FIG. 4 is a flowchart depicting the process of a login server authenticating a user.

FIG. 4 is a flowchart depicting the login server 16 authenticating a user 12. When the login server 16 receives user credentials from the web server 30 (step 405), the login server 16 compares the presented credentials with the credentials stored for the registered user 12 (step 415). If the values match, the user 12 is authenticated. However, if the values do not match, then the login server 16 sends an error message back to the web server 30 (step 420). The web server 30 then may determine whether to end communication or to allow the user 12 to reenter his or her credentials. One of ordinary skill will appreciate that comparing stored credentials to presented credentials is only one method of authenticating a user 12. Other methods may include algorithmic verification through message exchange between the login server 16 and a user 12 presenting a digital certificate or a challenge response protocol implemented when a user 12 utilizes a hardware token as his or her credentials. Regardless of the authentication method utilized, once the user 24 is authenticated, the login server 16 begins a login session by creating a token 50, in this example an inner token 50, that identifies the authenticated user 24 and the login session (step 425).

It is an advantage of the present invention to separate the login function from the application function as it provides flexibility to the networked computer system 110. In a conventional system, a user 12 is limited to certain credentials because of the limited functionality of the authentication application 33 within the application server 32. Typically, a user 12 is required to have a user name and password for authentication. In the context of a user 12 that is a computer or software application, this requirement is a limitation. In contrast, the system of the present invention can authenticate any user 12 having a credential recognized by the web server 30 and login server 16.

The login server 16 of the present invention creates an inner token 50 with a defined format, which is independent of the credential presented by a user 12 for authentication. Application servers 32, 36 within the authentication zone 20 will accept the inner token 50 created by the login server 16 regardless of the credential type that a user 12 utilized for authentication. The advantage of the login server 16 authenticating a user 12 and creating an inner token 50 that is recognized by all application servers 32, 36 within the authentication zone 20 is that these application servers 32, 36 are assured that the user 24 requesting services from them has been authenticated already. Application servers 32, 36 rely on authentication of the login server 16, specifically the inner token 50 created by the login server 16, rather than having to re-authenticate a user 24 for each new application server 32, 36 within a single login session.

Figure 5:
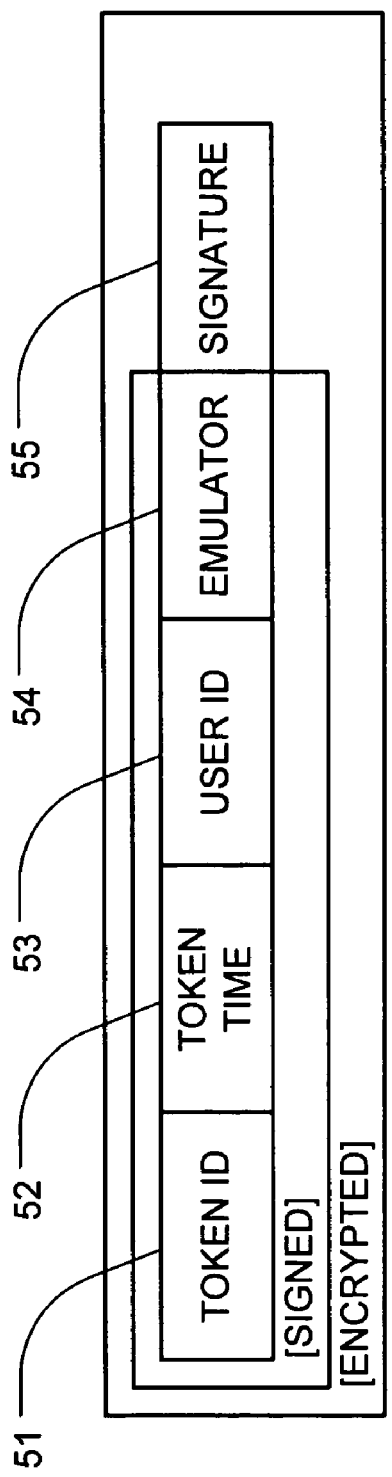
FIG. 5 is a depiction of the structure and content of the inner token created in FIG. 4.

FIG. 5 depicts the structure and content of the inner token 50 created in FIG. 4. The inner token 50 is a data structure that comprises a plurality of data nodes that store information that may be used to identify the authenticated user 24 and the token 50 itself. The inner token 50 comprises a token ID 51, which is a unique identifier for each inner token 50 created. One of ordinary skill in the art will understand that a networked computer system 110 may contain multiple login servers 16 and multiple users 12. Accordingly, the number of inner tokens 50 created may easily number into the millions. As such, the task of creating a unique token ID 51 for every inner token 50 in a networked computer system 110 is not inconsequential. In order to ensure uniqueness of the token ID 51, data values such as time of token creation or login server ID may be used in creating the token ID 51. The inner token 50 also comprises a token time 52, which represents the time when the login session begins and the inner token 50 is created or issued. The token time 52 is the official time for the inner token 50 and may be used to determine whether an inner token 50 has timed-out. The purpose and use of a time-out function will be explained in greater detail below.

The inner token 50 also comprises a user ID 53, which is a unique identifier for each authenticated user 24. The user ID 53 may be a user name or some other identifier inserted into the inner token 50 by the login server 16. However, the user ID 53 is not necessarily the user name or user value entered by a user 12 when requesting application services. The inner token 50 may also comprise an emulator data space 54. The emulator space 54 may not be filled with data every time an inner token 50 is created. Rather, the emulator data space 54 is used in the instance when an authenticated user 24 requests that a third-party access an application server 32 in the authentication zone 20 on behalf of the authenticated user 24. In the present example, the emulator data space 54 may be used when a bank customer having difficulty accessing his or her account balance requests that a bank service representative access his or her account information to determine where the problem is occurring. In this example, the service representative's identification information will be entered into the emulator space 54 of the inner token 50. If emulation is not occurring, the emulation space 54 may be set to void.

As is depicted in FIG. 4, once the inner token 50 has been created, the login server 16 digitally signs the inner token 50 (step 430). The token 50 may be digitally signed using an algorithm known as asymmetric encryption. Asymmetric encryption involves using a cryptographic key pair to secure information, in this instance, an inner token 50. Asymmetric key pairs may be used to encrypt a message or to verify the integrity of a message. A key pair used to encrypt a message is comprised of a private key or decryption key, which is known only to a single user or a small group of users, and a public key or encryption key, which may be known by anyone. In order to encrypt and decrypt a message, both the private key and public key of the key pair must be used. For example, a message may be encrypted by a sender using the public key of the intended recipient of the message. Once the recipient receives the encrypted message, his or her private key may be used to decrypt the message. Additionally, as used herein for digital signature, key pairs may be used to verify the integrity of a message. For this function, the key pair comprises a private key or digital signature key and a public key or signature verification key. The private key may be utilized to sign a message or, in this instance, a token 50. The public key then may be utilized to verify the integrity of the token 50. In this embodiment, the private signature key is stored in the login server 16, and an application server 32, 36 may use the login server's public verification key to verify the integrity of the signed inner token 50 by checking the signature 55. Any asymmetric encryption function and asymmetric digital signature function may be utilized. Asymmetric encryption functions include, but are not limited to, RSA, ElGamal and variants thereof, and Elliptic Curve ElGamal and variants thereof. Asymmetric digital signature functions include, but are not limited to, RSA, DSA or DSS (US Digital Signature Algorithm/Standard) and ECDSA (Elliptic Curve DSA).

After the inner token 50 has been digitally signed, the login server 16 encrypts the inner token 50 (step 435). While the inner token 50 has no size limitation, it is preferable that the token 50 be as compact as possible. It is more preferable that the inner token 50 be less than or equal to 2 kilobytes. One of ordinary skill in the art, however, will recognize that the degree of compaction depends upon the encryption method employed. In the present embodiment, the login server 16 encrypts the signed inner token 50 with a symmetric encryption key. Symmetric encryption involves using a single key that is shared among all users communicating with one another. A message is locked (encrypted) with a key and then the same key is used to unlock (decrypt) the message. In order to protect a message when using symmetric encryption, it is vital to have a secure method to exchange the secret key to all users. Any symmetric encryption function may be used. Symmetric encryption functions include, but are not limited to, AES, DES, 3DES, IDEA, RC5, RC6.

In the present embodiment, the symmetric key used to encrypt the signed inner token 50 is shared by the login servers 16 in the networked computer system 110 and application servers 32, 36 within the authentication zone 20. The symmetric key is not shared with the web server 30. This aspect of the system of the present invention is an advantage over conventional systems 10 because the web server 30 is unable to access the encrypted inner token 50 created by the login server 16. Limited access to the inner token 50 provides more security for the information contained therein.

The signed inner token 50 may be encrypted using asymmetric encryption rather than symmetric encryption. If asymmetric encryption is utilized, a different asymmetric key pair than the one utilized for signing the inner token 50 will be utilized for encryption and decryption of the inner token 50. In this embodiment, the login server 16 would encrypt the inner token 50 with the public key of the key pair of the particular application server 32, 36 that the authenticated user 24 wishes to access. The respective application server 32, 36 would then be able to decrypt the inner token 50 with its private key that matches the public key used to encrypt the inner token 50. If asymmetric encryption is used in the instant embodiment, it is preferred that all application servers 32, 36 within the authentication zone 20 use the same asymmetric encryption key pair. In this manner, the login server 16 would be able to use the same public key for encrypting inner tokens 50 for all application servers 32, 36 within the authentication zone 20.

Figure 6A:
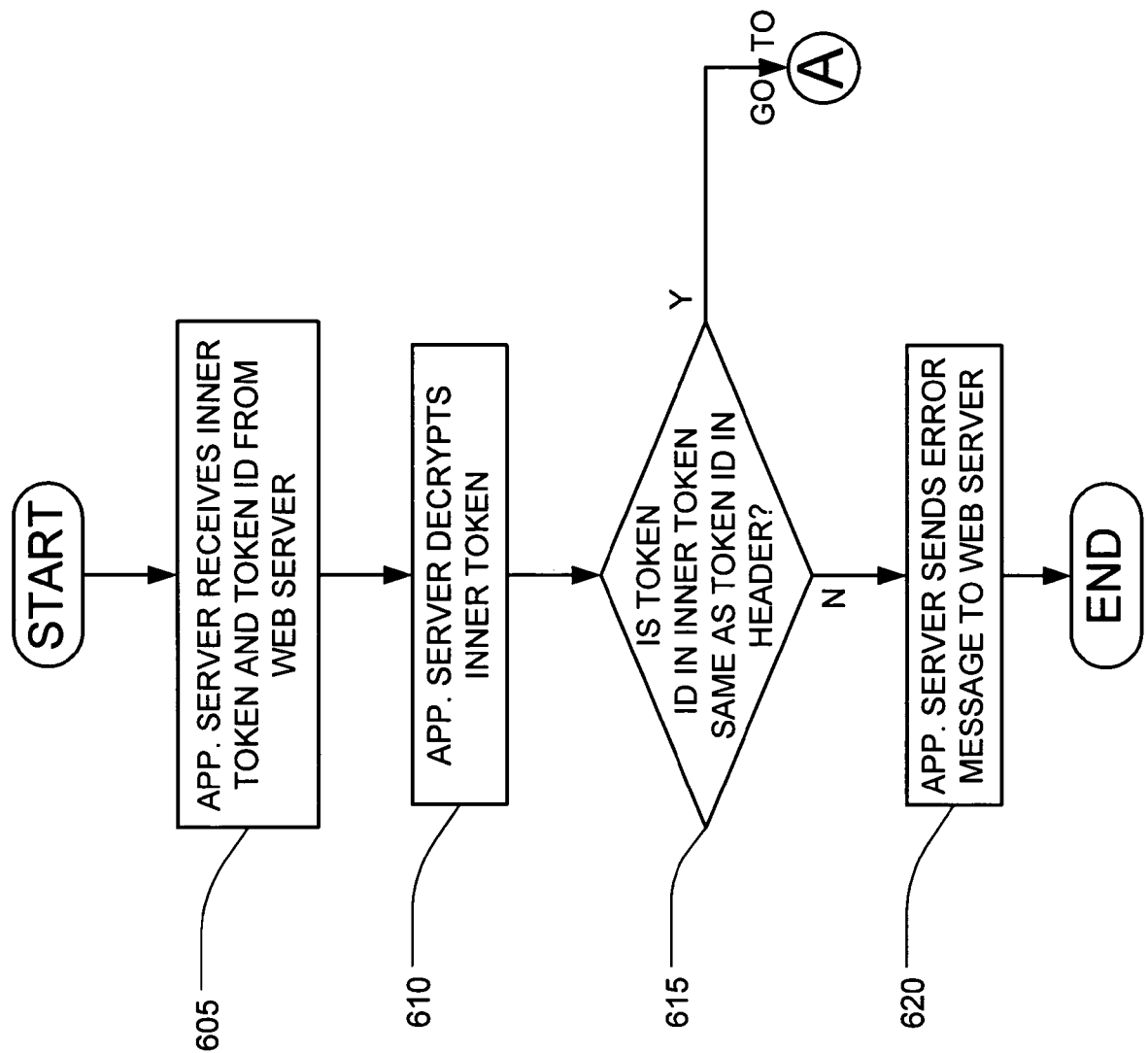
FIG. 6A is a first flowchart illustrating the verification process that an application server performs when it receives an encrypted inner token and token ID from a web server for the first time.
Figure 6B:
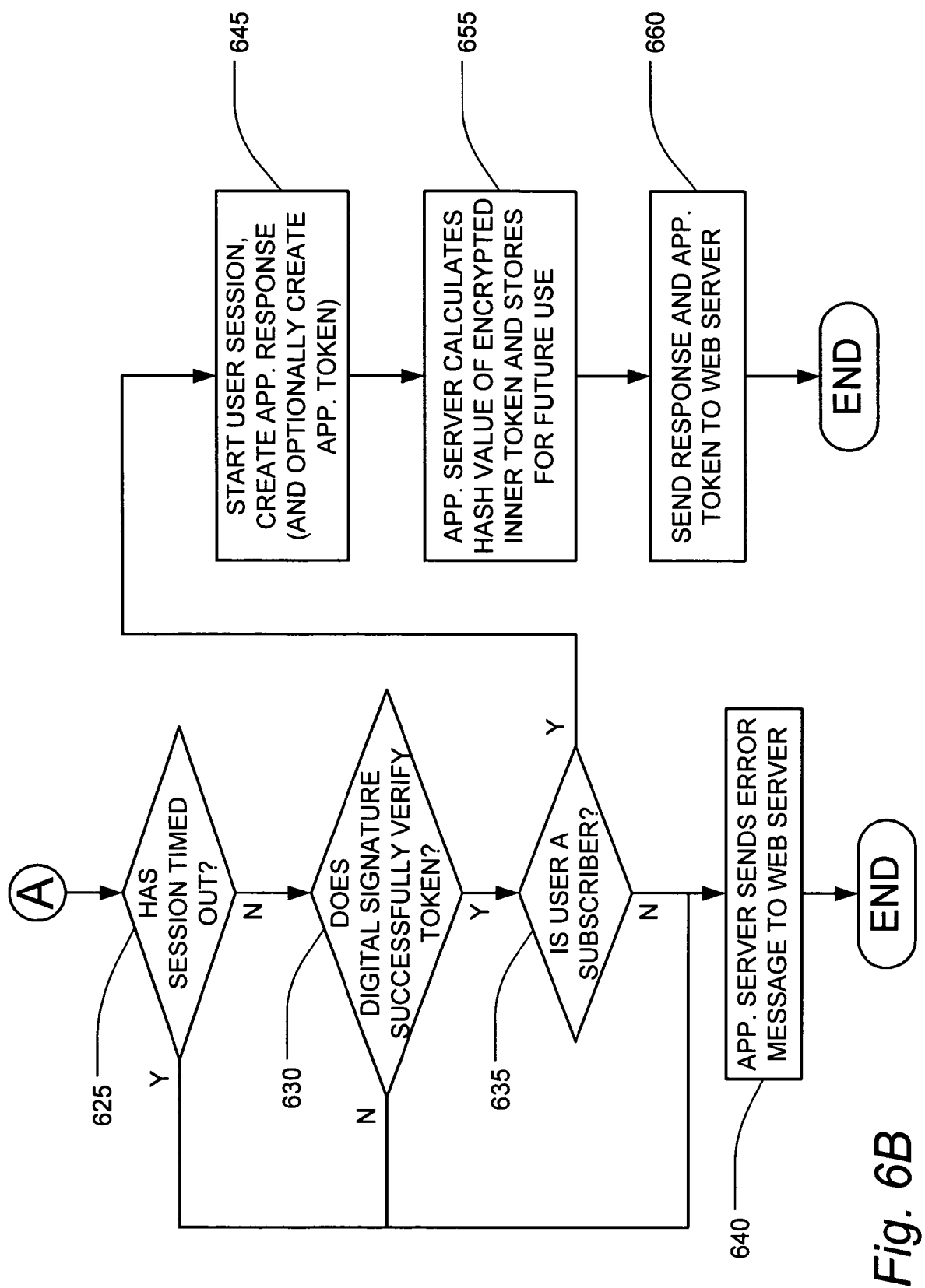
FIG. 6B is a second flowchart illustrating the verification process that an application server performs when it receives an encrypted inner token and token ID from a web server for the first time.

After the signed inner token 50 is encrypted (step 435), the encrypted inner token 50 is sent by the login server 16 to the web server 30 along with the token ID 51 (step 440 and 303). The web server 30 sends a copy of the encrypted inner token 50 and the token ID 51 to a particular application server 32 in the authentication zone 20 (step 304). However, the communication of the web server 30 to the application server 32 is synchronous communication in that the web server 30 keeps a copy of the encrypted inner token 50 and the token ID 51 and sends a copy of each to the application server 32. The web server 30 waits for a response from the application server 32 before continuing any action. FIGS. 6A & 6B depict the verification process that the application server 32 performs once it receives the encrypted inner token 50 and the token ID 51 (step 605). The application server 32 decrypts the encrypted inner token 50 using the shared symmetric key (step 610). However, decrypting the inner token 50 is not a destructive process, i.e., after the inner token 50 is decrypted, the application server 32 possesses both the encrypted inner token 50 and its decrypted contents. The application server 32 compares the token ID 51 in the inner token 50 to the token ID presented by the login server 16 (step 615). If the token ID values match, the application server 32 continues the verification process. If the token ID values do not match, the application server 32 sends an error message to the web server 30 (step 620). The web server 30 then determines whether to terminate the login session or allow the user 24 to reenter his or her credentials.

Assuming the token ID values match, the application server 32 checks the token time 52 to verify that the login session has not timed-out (step 625). Specifically, the application server 32 subtracts the token time 52 from the actual time to determine the length of time that the inner token 50 has been in existence. The application server 32 then compares the time in existence with its time-out function. If the inner token 50 has been in existence for less time than is provided in the time-out function, then the login session will continue. Each application server 32, 36 within a networked computer system 110 has a security protocol, which includes a time-out function. The time-out function determines the length of time that an authenticated user 24 will be able to use an inner token 50. The functionality of the application server 32, 36 will determine the length of the time-out function for that application server 32, 36. For the present embodiment, an exemplary time-out function may be 30-90 minutes.

If an inner token 50 has not timed-out, the application server 32 verifies the signature of the inner token 50 using the public key of the login server 16 (step 630). Lastly, the application server 32 verifies that the authenticated user 24 is a subscriber to the particular application server 32 being accessed (step 635). In the present example, this would include the banking server verifying that the authenticated user 24 is a subscriber to the bank's online banking service. If any of the steps 625, 630 or 635 have a negative result, the application server 32 sends an error message to the web server 30 (step 640). Once all of the verification steps are successfully completed, the application server 32 begins an application session for the authenticated user 24 (step 645). Depending upon the particular application server 32 being accessed, the application server 32 may create an application token when the application session begins for sending to the authenticated user 24. Some application servers 32, 36 create application tokens for sending to users 24 and some do not. Whether an application server 32, 36 creates an application token does not affect the functionality of the authentication system and method of the present invention.

After an application session has begun, the application server 32 calculates a hash value for the encrypted inner token 50 and stores the hash value either in its own storage or in the database system 28 of the authentication zone 20 (step 655). Hashing involves transforming an input message of any size into an output or hash value of another, generally smaller, size using a mathematical algorithm. The hash value is known as the message digest. The message digest is a "digital fingerprint" of the input message and serves to maintain integrity of the hashed message by allowing a recipient to verify that the message has not been tampered with since being hashed. The hash value is then stored in the authentication zone 20 for the lifetime of the particular application session.

Figure 7:
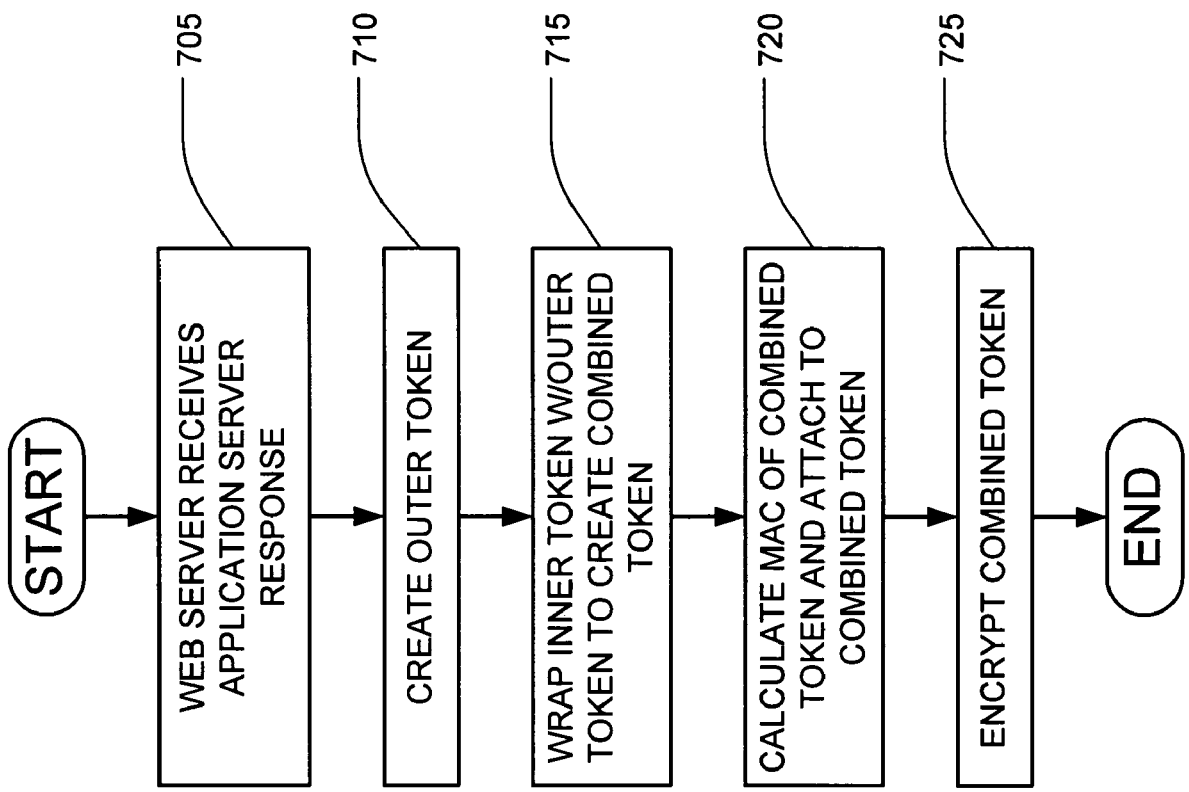
FIG. 7 is a flowchart illustrating the processing of the inner token by the web server after receiving the inner token back from the application server.

The application server 32 sends an application server response and the application token (if created) to the web server 30 (step 305 and 660). FIG. 7 depicts the web server 30 creating an outer token 70 (step 710) and wrapping it around the inner token 50 to form a combined token 60 (step 715).

FIG. 8A depicts the outer token 70 and its contents. The outer token 70 is a data structure that comprises a plurality of data nodes that store information that may be used to ensure the integrity of the token itself. The outer token 70 comprises the same token ID 51 that is in the inner token 50. It also may include a rolling time period 64 (RTP). The rolling time period 64 is the length of time that the outer token 70 will be valid. In the present example, the rolling time period 64 is meant to cover the time between each computer mouse click of a authenticated user 24. The outer token 70 may also include a rolling time stamp 65 (RTS). The rolling time stamp 65 is the time at which the outer token 70 is created. In the instant example, the rolling time stamp 65 is indicated in seconds. In order to determine whether the outer token 70 has timed-out, the web server 30 subtracts the rolling time stamp 65 from actual time and compares the value to the rolling time period 64. As long as the difference is less than the rolling time period 64, the outer token 70 has not timed-out, i.e., the outer token 70 is valid. The outer token 70 may also include a place holder 68 for indicating whether the token 70 is a standard use token or an emulation token.

The outer token 70 may include an authentication state indicator (AST) 69, which indicates the form of authentication that was used by the login server 16. The authentication required for an application server 32 may vary depending on the security requirements for the application server 32. As such, some application servers 32 may require a specific form of authentication. The outer token 70 may also include a place holder 75 for application specific data. For example, some application servers 32 require data that other application servers 36 do not require and which are not included in any other portion of the outer token 70 or inner token 50. The application specific field 75 of the outer token 70 can accommodate any additional information that an application server 32 requires. One of ordinary skill in the art will recognize that additional fields may be added to the outer token 70 as needed for any particular application server 32 or networked computer system 110. The authentication state indicator 69 and the application specific field 75 are optional. When the inner token 50 and outer token 70 are combined, the combined token 60 includes an inner token key tag 66. The inner token key tag 66 indicates the encryption key used to encrypt the inner token 50. A key tag 66 is useful in a networked computer system 110 in which encryption keys are refreshed and rotated.

As is indicated in FIG. 7, once the outer token 70 is created and wrapped around the inner token 50, the combined token 60 is hashed using a hash-based authentication code key (HMAC key) (step 720). Any hashing function may be used for the HMAC key including, but not limited to, MD5, SHA-1, SHA-232, SHA-256, SHA-504 and SHA-512. A hash value or message authentication code (MAC) 71 containing the result of the keyed hash function is attached to the combined token 60. The web server 30 encrypts the combined token 60 with a symmetric key that is shared among each web server 30 in the networked computer system 110 (step 725). The symmetric key used to encrypt the combined token 60 is not shared with the application server 32, 36 and login server 16. While the combined token 60 has no size limitation, it is preferable that the token 60 be as compact as possible. It is more preferable that the combined token 60 be less than or equal to 2 kilobytes. One of ordinary skill in the art, however, will recognize that the degree of compaction depends upon the encryption method employed.

An outer token key tag 61 indicating the keys used to encrypt and hash the combined token 60 is attached to the encrypted combined token 60. A networked computer system 110 wherein all keys are not known to all servers is an advantage over a conventional system 10. In the system of the present invention, at least the login server 16, the web server 30 and the application server 32 cooperate in order to provide the requested application services. This system between servers provides greater security for application servers 32, 36 and information within the authentication zone 20.

Once the combined token 60 is encrypted, the web server 30 sends the application response, including the encrypted combined token 60 and the application token (if created) to the authenticated user 24 (step 306). In this example, this is the point when the authenticated user 24 at the bank web site will have access to his or her bank account. Information such as checking account balance, savings account balance, etc. may be viewed.

Typically however, an authenticated user 24 will want to do more than just initially access an application server 32. An authenticated user 24 may want to visit the application server 32 numerous times in one application session in order to request additional information or services. For example, the authenticated user 24 accessing his bank account, may want to see the checks or debit card transactions that have been processed since his last statement or transfer money from his checking account to his savings account. Any of these requests for information or services constitute additional visits to the initially accessed application server 32.

Figure 9:
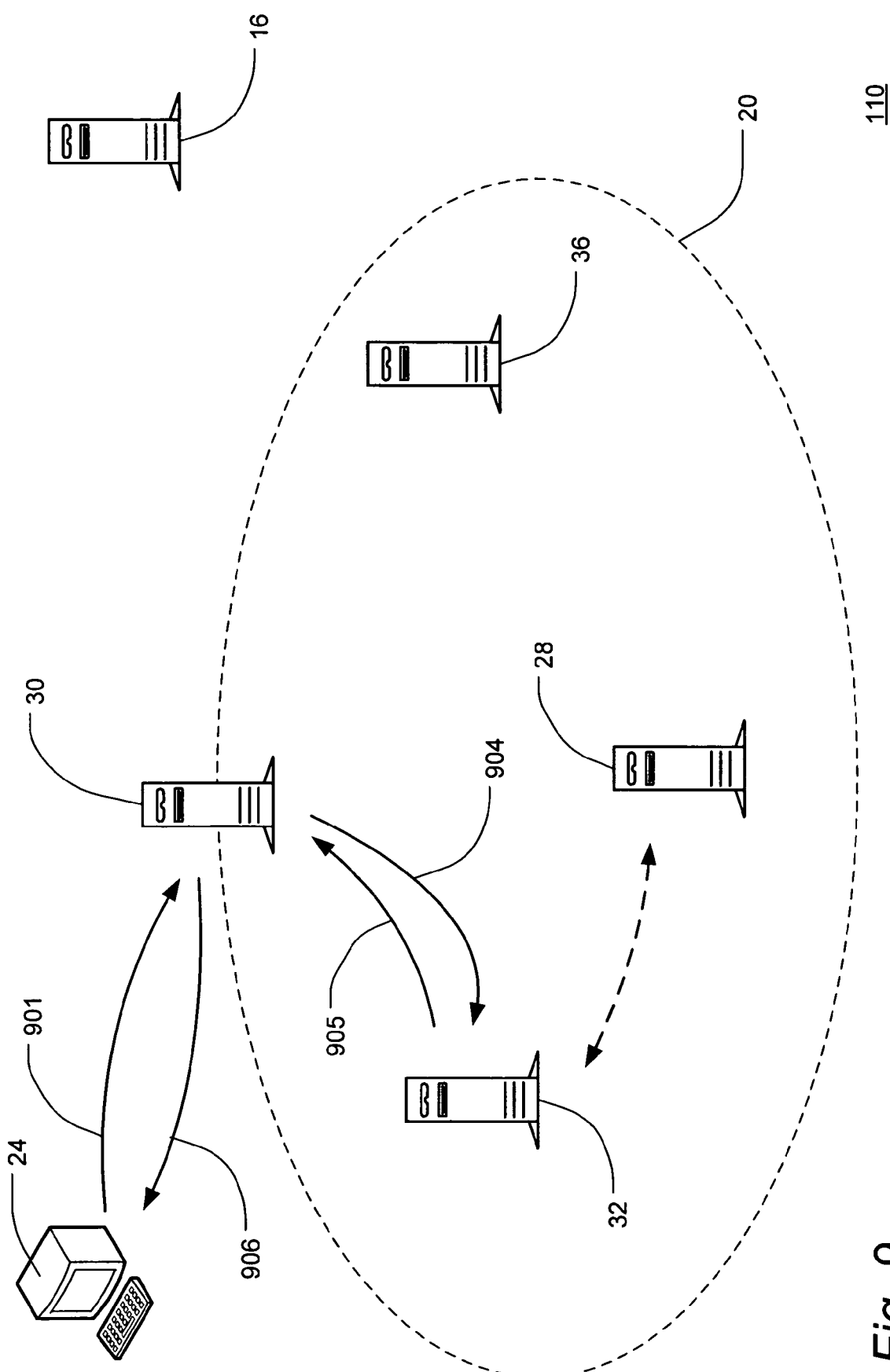
FIG. 9 is a depiction of the process of a subsequent visit by a user to a previously accessed application server.

FIG. 9 depicts the process for an authenticated user 24 subsequently visiting a previously accessed application server. The authenticated user 24 requests a subsequent visit to the application server 32 by presenting the combined token 60 and the application token (if created) to the web server 30 (step 901). In the present example, the authenticated user 24 may wish to see the number of debit card transactions that have been processed since his last statement. To do this, he will click on the portion of the web site which requests access to debit card transactions. When he does this, the combined token 60 and online banking token are returned to the web server 30.

The web server 30 decrypts the combined token 60 using the web server symmetric key. One of ordinary skill in the art will understand that networked computer systems may include multiple web servers 30. Accordingly, the same web server 30 that initially created the outer token 70 and encrypted the combined token 60 may not be the web server 30 that receives the authenticated user 24 request on a subsequent visit. Using a symmetric encryption key that is shared among the web servers 30 of the networked computer system 110 allows any web server 30 in the system to decrypt a combined token 60 encrypted by any other web server 30 in the system. After the combined token 60 is decrypted, the web server 30 calculates a hash value for the combined token 60 utilizing the HMAC key indicated by the outer key tag 61 and compares this calculated hash value to the hash value 71 stored with the combined token 60. Assuming the hash values match, the web server 30 verifies that the outer token 70 has not timed-out, i.e., the rolling time period 64 has not been exceeded.

Figure 10:
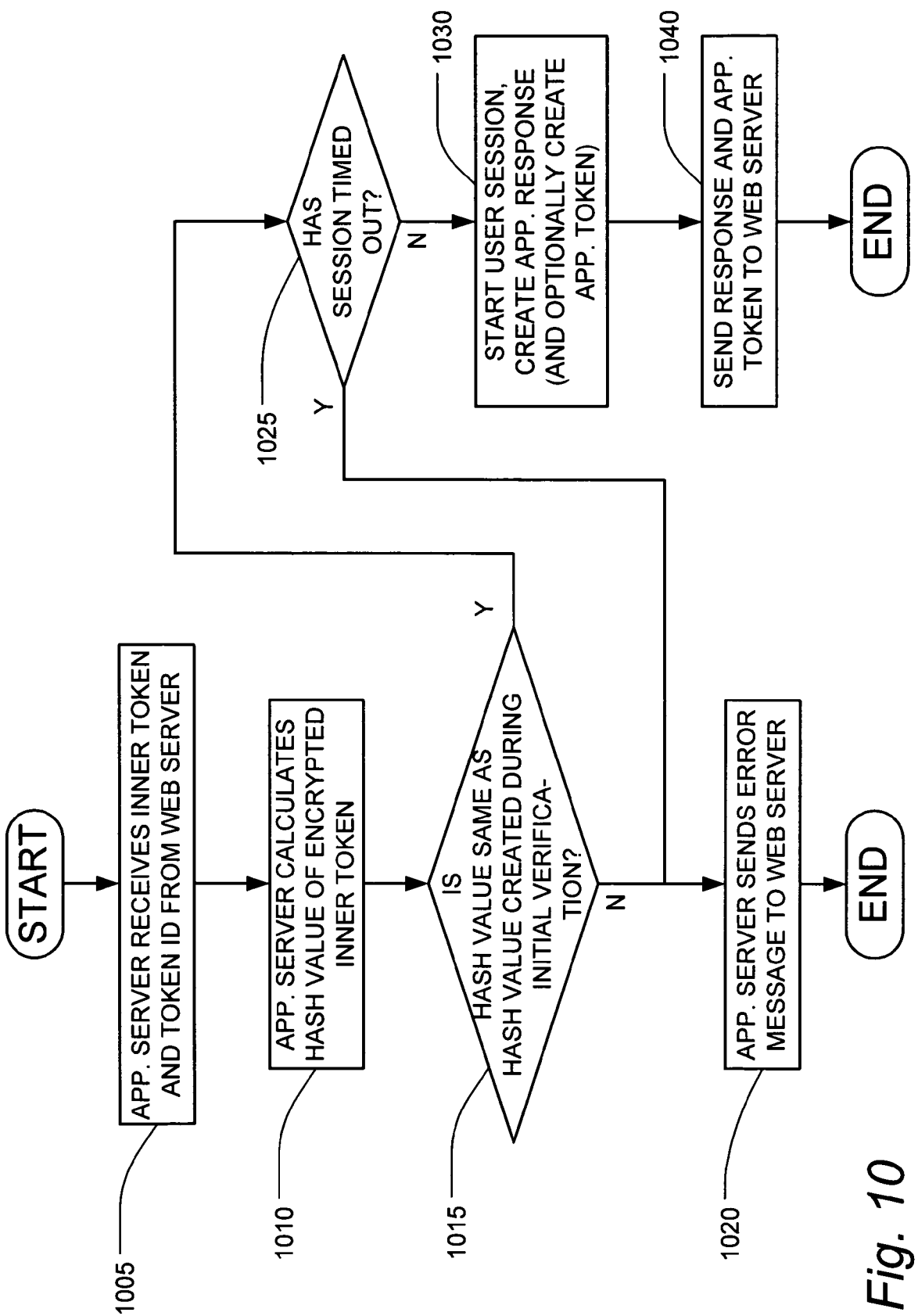
FIG. 10 is a flowchart illustrating the verification process that an application server performs upon the subsequent receipt of an encrypted inner token and token ID from a web server.

FIG. 10 depicts the verification process that an application server 32 performs upon subsequent visit by an authenticated user 24. The web server 30 sends the encrypted inner token 50, token ID 51 and application token (if created) to the application server 32 (step 904 and 1005). On subsequent visits to the application server 32, the application server 32 does not have to perform the same verification that was performed upon the initial visit by the authenticated user 24. Rather, the application server 32 may calculate a hash of the encrypted inner token 50 (step 1010) and compare that hash value to the hash value that was computed and stored during initial user verification (step 1015). Verifying an authenticated user 24 with a hash function upon subsequent visits is faster than user verification upon an initial visit and saves computer functionality without sacrificing security. The application server 32 will also verify its application token (if created) upon subsequent visits by an authenticated user 24 and verify that the token 50 has not timed out (step 1025). If step 1015 or 1025 have a negative result, the application server 32 sends an error message to the web server 30 (step 1020). Once verification is complete, the application server 32 processes the request, updates its application token (if created) (step 1030), and sends an application response to the web server 30 (step 905 and 1040).

The web server 30 updates the rolling time stamp 65 in the outer token 70, calculates a new hash value 71 for the combined token 60 and encrypts the combined token 60. The web server 30 returns the application response including the encrypted combined token 60 and the application token (if created) to the authenticated user 24 (step 906). In the present example, the authenticated user 24 will be able to see all debit transactions since his last statement. The process of FIG. 9 occurs for each subsequent user request to access an application server 32, i.e., once an application server 32 has verified an authenticated user 24 within a single login session, the process of FIG. 9 will be followed for each subsequent request to that application server 32 by the authenticated user 24.

Figure 11:
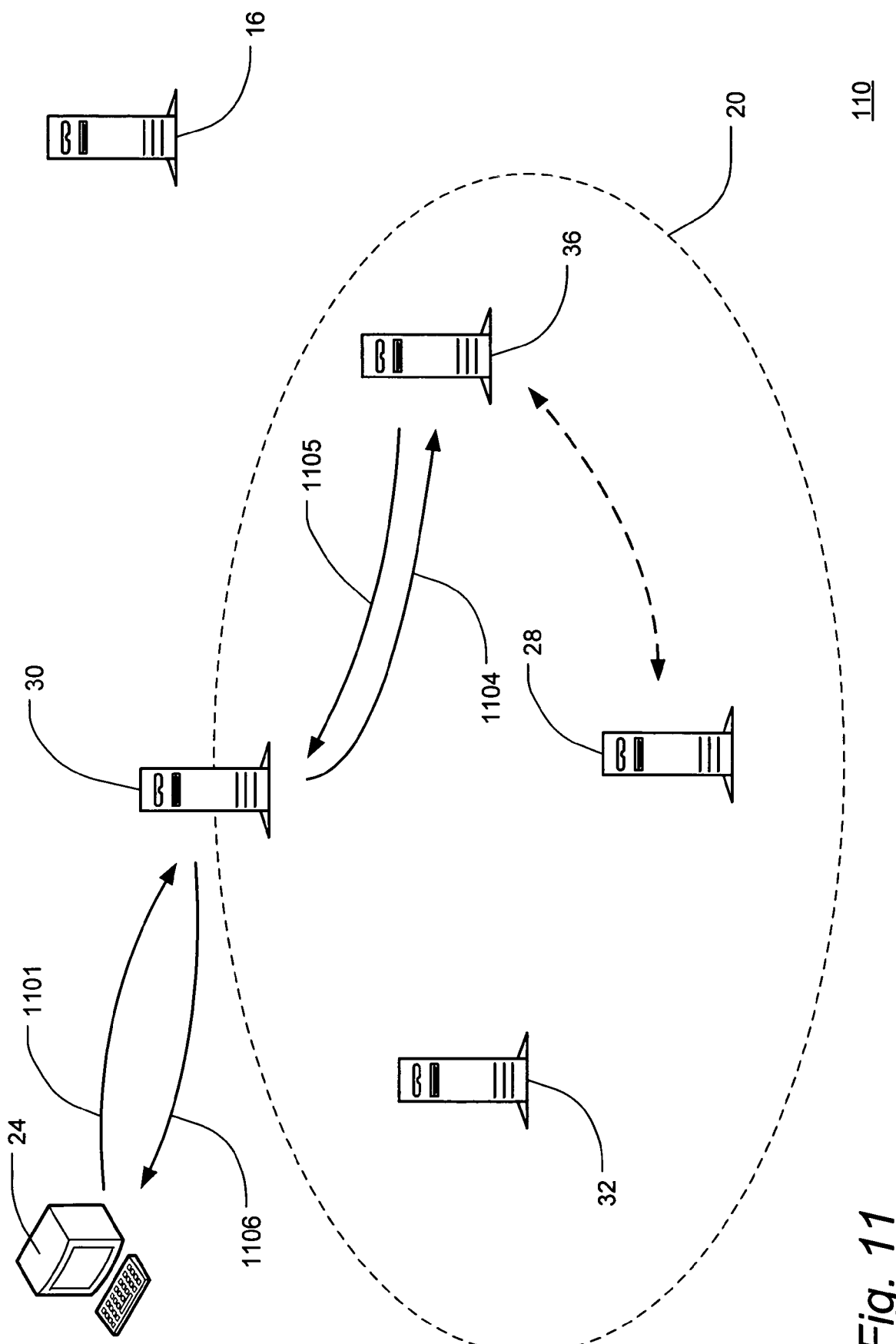
FIG. 11 is a depiction of the process by which a user accesses a second application server after being initially authenticated by the login server.

An authenticated user 24 may want to access another application server 36 within the authentication zone 20 during a login session. For example, the authenticated user 24 may wish to access his brokerage accounts while he or she is logged-in to the bank web site. FIG. 11 depicts the process of an authenticated user 24 accessing a second application server 36 after being initially authenticated by the login server 16. When an authenticated user 24 requests access to a second application server 36 in a single login session, the authenticated user 24 will have an encrypted combined token 60 and an application token from the first application server 32 (if created).

The authenticated user 24 presents the encrypted combined token 60 and the application token from the first application server 32 to the web server 30 and requests access to a second application server 36 (step 1101). The web server 30 decrypts the combined token 60, verifies the integrity of the combined token 60 by comparing a calculated hash value to the hash value 71 stored with the combined token 60, and verifies that the outer token 70 has not timed-out. The web server 30 presents the encrypted inner token 50 and token ID 51 to the second application server 36 (step 1104). Since this is the first time that the second application server 36 has been presented with a request from the authenticated user 24, the second application server 36 will verify the authenticated user 24 in the same manner that the first application server 32 did upon initial visit. Specifically, the application server 36 decrypts the encrypted inner token 50 using the shared symmetric key. The application server 36 verifies that the token ID 51 in the inner token 50 matches the token ID 51 provided by the web server 30. The second application server 36 then checks the token time 52 to verify that the login session has not timed-out. The second application server 36 verifies the signature of the inner token 50 using the public key of the login server 16. Lastly, the second application server 36 verifies that the authenticated user 24 is a subscriber to the particular application server 36 being accessed. In the present example, the brokerage server verifies that the authenticated user 24 is a subscriber to the bank's online brokerage service. Once all of the verification steps are successfully completed, the second application server 36 begins an application session for the authenticated user 24. Depending upon the application server 36 being accessed, the application server 36 may create an application token for sending to the authenticated user 24.

After an application session has begun, the application server 36 calculates a hash value for the encrypted inner token 50 and stores the hash value either in its own storage or in the database system 28 of the authentication zone 20. The hash value is stored in the authentication zone 20 for the lifetime of the particular application session.

The second application server 36 sends an application response including the application token (if created) to the web server 30 (step 1105). The web server 30 creates an outer token 70 that is wrapped around the encrypted inner token 50 to form a combined token 60. Once the outer token 70 is created and wrapped around the encrypted inner token 50, a hash value is calculated for the combined token 60. A hash value 71 containing the result of the keyed hash function is attached to the combined token 60. The web server 30 encrypts the combined token 60 with a symmetric key that is known to all web servers 30, and an outer token key tag 61 indicating the keys used to encrypt and hash the combined token 60 is attached to the encrypted combined token 60. Once the combined token 60 is encrypted and hashed, the web server 30 sends the encrypted combined token 60 and the application token (if created) with the application response to the authenticated user 24 (step 1106). In this example, the authenticated user 24 at the bank web site will have access to his or her brokerage account. The process depicted in FIG. 11 may, be used to access any subsequent application server within a single login session.

The processes described above, namely accessing a first application server upon initial login, subsequently accessing an application server after login and accessing a second application server after login, encompass the scope of interactions that a user may desire when accessing application servers within an authentication zone. While the examples provided above are for a user that is an individual accessing application servers through a web server, the system and method of the present invention is equally applicable to a user such as a computer application or software function accessing any application server within a protected zone.

The authentication system for protected computer applications provides several advantages over known authentication systems. The system of the present invention is more secure than conventional systems. In the present system, knowledge of encryption keys is separated by server functionality, whereas, in conventional systems all encryption keys are known by all servers. Separation of keys by functionality ensures that at least three servers within the authentication system must cooperate in order to complete a user request. In this manner, a bad actor is unable to compromise the entire authentication system by compromising merely one server. Rather, communication will end and the bad actor will be prohibited from entering the protection zone. Accordingly, the system of the present invention ensures greater security within the authentication system.

Additionally, separating the login functionality from the application functionality provides greater flexibility and security within the authentication system. Applications and information within the authentication zone are accessible to more types of users since a user is not limited to only using a user name and password as a credential for authentication. Further, aspects of the inner token provide greater security for the system of the present invention. The digital signature on the inner token verifies that the inner token has not been compromised and has not been created by an entity other than the login server. The time-out function of the inner token ensures that an inner token is not valid for an indefinite period of time. The unique token ID created by the login server provides further protection to the authentication system. By placing the unique token ID in both the outer and inner token, the system is less vulnerable to "cut-and-paste" attacks whereby a bad actor attempts to enter the protected zone by combining an outer token and an inner token that were not created to be combined, e.g, combine an inner token with time remaining with an new outer token when the outer token created for the inner token timed-out. Since the unique token ID is placed in both the outer token and inner token, it will be readily apparent in a cut-and-paste type attack that the token IDs do not match.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to a particular embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of authenticating a user by an authentication server in a networked computer system, the method comprising:

presenting user credentials by a user to a gatekeeper server;

providing presented user credentials by the gatekeeper server to an authentication server;

authenticating the user by the authentication server;

creating an authentication token by the authentication server upon authentication of the user to uniquely identify the user, the authentication token being independent of the user credentials presented by the user and verifiable without a need for the user to re-present the user credentials;

encrypting the authentication token by the authentication server using a key not shared with the gatekeeper server;

transmitting the authentication token by the authentication server to an application server, wherein transmitting the authentication token to the application server comprises transmitting the authentication token by the authentication server to the gatekeeper server and then transmitting the authentication token by the gatekeeper server to the application server;

creating an outer token by the gatekeeper server;

wrapping the outer token around the authentication token to form a combined token;

encrypting the combined token by the gatekeeper server using a key not shared with the authentication server; and sending the encrypted combined token to the authenticated user;

wherein the authenticated user is allowed to present the combined token to the gatekeeper server without having to be re-authenticated.

2. The method of authenticating a user of claim 1, further comprising providing application services by an application server to the user.

3. The method of authenticating a user of claim 1, further comprising digitally signing the authentication token by the authentication server.

4. The method of authenticating a user of claim 3, further comprising utilizing the digital signature to verify by the application server that the authentication token was created by the authentication server.

5. The method of authenticating a user of claim 4, wherein the application server verifies the authentication token.

6. The method of authenticating a user of claim 1, further comprising verifying the authentication token by the application server.

7. The method of authenticating a user of claim 1, wherein the authentication token comprises a plurality of data nodes stored therein representing a data structure.

8. The method of authenticating a user of claim 7, wherein the data structure comprises:
   (a) a first data node comprising data indicating the time the data structure was created;
   (b) a second data node comprising data representing the user; and
   (c) a third data node comprising unique data identifying the data structure.

9. The method of authenticating a user of claim 1, further comprising encrypting the authentication token by the authentication server.

10. The method of authenticating a user of claim 9, wherein encrypting the authentication token comprises utilizing an encryption key shared by the authentication server and application server to encrypt the authentication token wherein the encryption key is not known by the gatekeeper server.

11. The method of authenticating a user of claim 10, further comprising decrypting the authentication token by the application server.

12. The method of authenticating a user of claim 11, further comprising transmitting the authentication token by the application server to the gatekeeper server after transmitting the authentication token by the authentication server to the application server.

13. The method of authenticating a user of claim 12, further comprising creating an outer token by the gatekeeper server.

14. The method of authenticating a user of claim 1, further comprising wrapping the authentication token with the outer token using a key or key pair known only to the gatekeeper server to form a combined token and returning the combined token to the user.

15. The method of authenticating a user of claim 1, wherein the user is an individual.

16. The method of authenticating a user of claim 1, wherein the user is a computer.

17. The method of authenticating a user of claim 1, wherein the user is a software function.

18. The method of authenticating a user of claim 1, wherein the user credentials comprise a user name and password.

19. The method of authenticating a user of claim 1, wherein authenticating the user by the authentication server comprises comparing the presented user credentials to stored user credentials.

20. The method of authenticating a user of claim 1, wherein the user credentials comprise a digital certificate.

21. The method of authentication a user of claim 20, wherein authenticating the user by the authentication server comprises verifying the identity of the user by exchanging messages between the authentication server and the user.

22. The method of authenticating a user of claim 1, wherein the user credentials comprise a portable device containing data that authenticates the user.

23. The method of authenticating a user of claim 1, wherein the user credentials comprise a user input and a value generated by a portable device that verifies the user input.

24. An authentication system within a networked computer system, comprising:
   a user;
   an application server;
   an authentication server separate from the application server utilized to authenticate a user; and
   an authentication token generated by the authentication server to uniquely identify the user, wherein the authentication token is independent of the user credentials presented by the user and the authentication token is utilized by the application server to verify that the user has been authenticated by the authentication server, the authentication token being encrypted by the authentication server and the encrypted authentication token being wrapped by an outer token and encrypted to form a combined token, and
   wherein the user is allowed to present the combined token to the gatekeeper server without having to be re-authenticated.

25. The authentication system of claim 24, wherein the authentication server is communicatively connected to the networked computer system.

26. The authentication system of claim 24, wherein communication to the authentication server is controlled by a protective device.

27. The authentication system of claim 26, wherein the protective device is a firewall.

28. The authentication system of claim 24, further comprising a gatekeeper server communicatively connected to the application server and the authentication server.

29. The authentication system of claim 28, wherein the authentication server receives direct communication only from the gatekeeper server.

30. The authentication system of claim 28, wherein the application server receives direct communication only from the gatekeeper server.

31. The method of authenticating a user of claim 1, wherein the combined token is less than or equal to 2 kilobytes.

32. The authentication system of claim 24, wherein the combined token is less than or equal to 2 kilobytes.

33. The method of authenticating a user of claim 14, wherein the user returns the combined token to the gatekeeper server.

34. The method of authenticating a user of claim 33, further comprising:
   decrypting the combined token by the gatekeeper server,
   evaluating the outer token by the gatekeeper server, and
   passing the authentication token to the application server.

* * * * *